United States Patent

[19]

Lutz

[11] 4,117,464
[45] Sep. 26, 1978

[54] MICROWAVE MOTION-DETECTION APPARATUS EMPLOYING A GUNN OSCILLATOR IN A SELF-DETECTING MODE

[75] Inventor: Erno B. Lutz, Sunnyvale, Calif.

[73] Assignee: Solfan Systems, Inc., Mountain View, Calif.

[21] Appl. No.: 741,034

[22] Filed: Nov. 11, 1976

[51] Int. Cl.$^2$ .................... G01S 9/42; G08B 13/24
[52] U.S. Cl. ............................ 340/554; 325/186; 331/107 G; 343/5 PD
[58] Field of Search .............. 340/258 A, 258 B; 343/5 PD, 7.7; 331/107 G, 176, 186; 325/151, 159, 186

[56] References Cited

U.S. PATENT DOCUMENTS

| | | | |
|---|---|---|---|
| 3,691,556 | 9/1972 | Bloice | 343/5 PD |
| 3,697,989 | 10/1972 | Bailey et al. | 343/5 PD |
| 3,731,307 | 5/1973 | Charlot, Jr. | 343/7.5 |
| 3,733,551 | 5/1973 | Augenblick et al. | 325/105 |
| 3,946,503 | 3/1976 | Whitman | 340/258 B |

Primary Examiner—Donald J. Yusko
Assistant Examiner—Joseph E. Nowicki
Attorney, Agent, or Firm—Schatzel & Hamrick

[57] ABSTRACT

Microwave apparatus for detecting the movement of a moving object comprising a Gunn oscillator device having input terminals that are capable of receiving a potential difference which serves to produce a bias current in the device, said potential difference being subject to variations, the device being responsive to a constant potential difference and operative to radiate microwave energy at a first frequency, and further responding to Doppler shifted energy reflected from the moving object and producing a variation in the bias current, an operational amplifier responsive to the potential difference and a reference signal for developing a first signal when the potential difference exceeds the reference signal and a second signal when it is less, a series-pass transistor connected to a source of DC potential and the operational amplifier and being switchable between a conducting and a non-conducting state in response to the first and second signals and serving to maintain the potential difference at a constant value and a resistive element connected between an output of the transistor and the Gunn oscillator for sensing the variation in the bias current and developing an output signal representative of the movement of the moving object.

6 Claims, 1 Drawing Figure

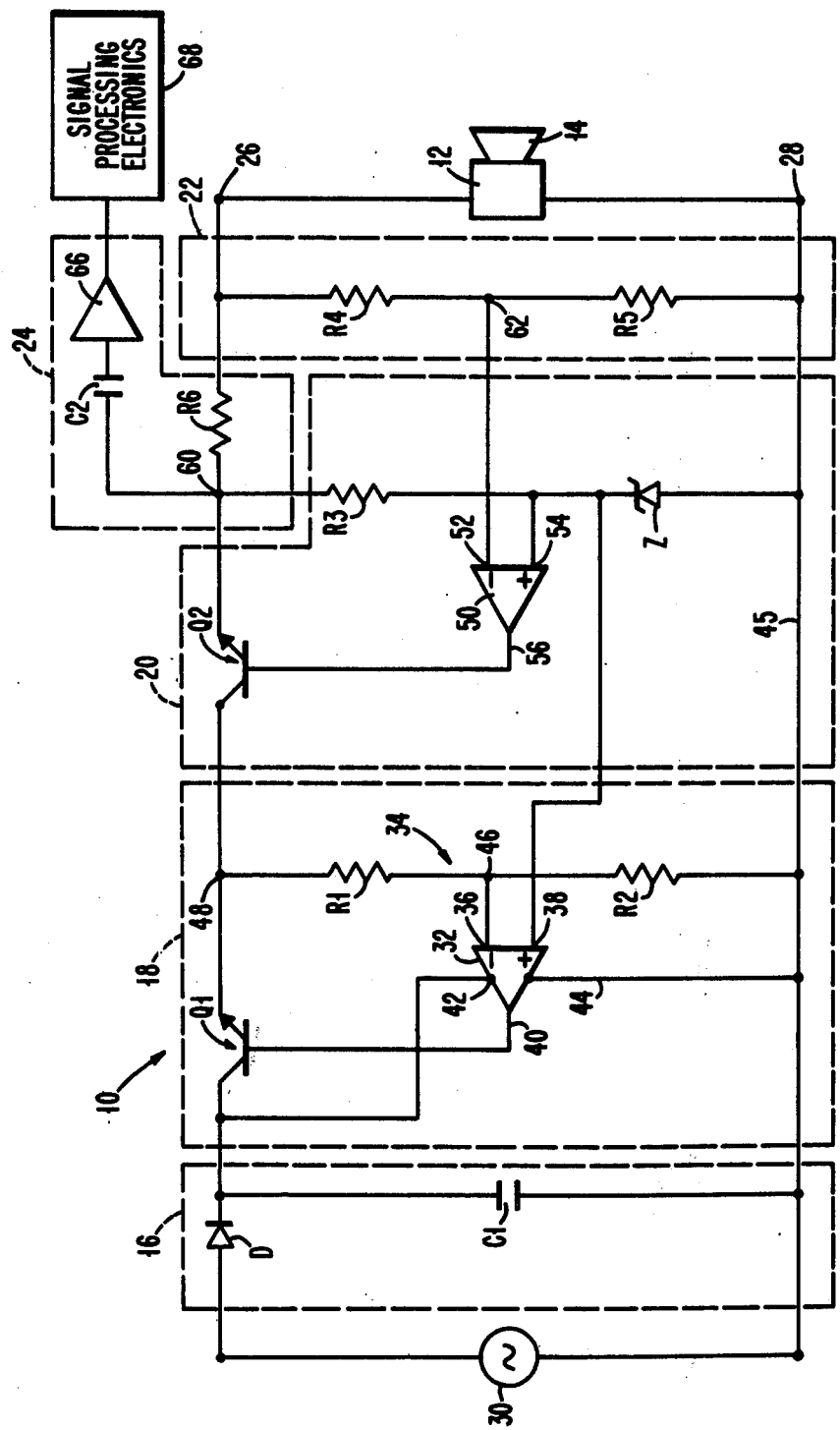

MICROWAVE MOTION-DETECTION APPARATUS EMPLOYING A GUNN OSCILLATOR IN A SELF-DETECTING MODE

BACKGROUND OF THE INVENTION

1. Field of the Invention

The present invention relates generally to an apparatus for automatically detecting the movement of a moving object, and more particularly, to a microwave motion-detection apparatus employing a Gunn oscillator in a self-detecting mode.

2. Description of the Prior Art

Microwave detection systems utilizing the Doppler principle are commonly used to actuate sliding doors and detect intruders or the like. In Doppler-type systems, frequency differences between generated and reflected electrical signals are monitored to detect the movement of objects within a monitored area. In practice, such systems ae plagued by false alarms despite the introduction of filtering networks and the use of signal-isolation techniques. Furthermore, as filtering networks are added, the Doppler-type systems become extremely complex and, consequently, expensive to implement and maintain.

In one system a transmitter having a Gunn oscillator is employed to produce a microwave signal in the X-band region, between 10.500 and 10.550 gigahertz (GHz). A horn antenna transmits and directs the microwave signal to the area under observation. When an object moves within the area it causes an electrical signal to be reflected back toward the transmitter. The electrical signal has a frequency which is Doppler shifted from the transmitted signal by an amount corresponding to the movement of the object. A receiver having a diode detector is disposed proximate the transmitter to detect the reflected signal and to produce an indication of the presence of the moving object. Since a separate transmitter and receiver are required, such systems are relatively expensive to manufacture.

Furthermore, it should be noted that a Gunn oscillator requires a highly regulated DC potential difference across its input terminals in order to produce an output signal at a preselected frequency in the X-band region of the electromagnetic specturm. Should the potential difference exceed that specified by the manufacturers then the Gunn device may be permanently damaged and should it vary much from an optimum value then the frequency of the output signal will correspondingly vary. In this regard the Federal Communications Commission has allocated the frequency spectrum between 10.500 and 10.550GHz to microwave transmitters used as field disturbance sensors in the security industry. Consequently, microwave transmitters producing signals outside the allocated spectrum can not be utilized in commercially available field disturbance sensors. As a result the potential difference applied to commercial Gunn oscillators must be constant. In addition, the bias current flowing through each one of a family of Gunn oscillators may vary over a wide range of values, e.g., between 90 and 120 milliamps. Because of this wide variation in DC bias current had since reflected signals tend to cause the bias current to vary with time, Gunn oscillators have not been used as a receiver or detection device for reflected signals in a commercial security system.

In this regard, it should be noted that a Gunn oscillator has been used as a receiver in a laboratory experiment. In the experiment, a power supply having a variable output voltage was connected through a series resistance to the terminals of a Gunn oscillator and the voltage was adjusted to cause the oscillator to produce X-band radiation. Variations in bias current due to reflected signals are sensed as voltage variations across the series resistor. However, such an apparatus is not capable of automatically providing a constant potential difference when a different Gunn oscillator is employed or when the bias current varies due to temperature fluctuations or due to variation of the Gunn device characteristics with time.

Examples of prior art motion detection systems include U.S. Pat. No. 3,634,884, entitled "Motion Dection System", by Vernon B. Ross; U.S. Pat. No. 3,665,443, entitled "Ultrasonic Intrusion Alarm", by Aaron A. Galvin; U.S. Pat. No. 3,742,434, entitled "Automatic Door-Opening System Using An Acoustic Object Detection System", by Warren L. Leyde and Delbert E. Marker; and U.S. Pat. No. 3,813,669 entitled "Frequency Filter Circuit Apparatus", by Leonard Thomas Saunders.

SUMMARY OF THE PRESENT INVENTION

It is therefore an object of the present invention to provide a motion-detection apparatus that employs a Gunn oscillator as a transmitter and as a receiver in a self-detection mode of operation.

Another object of the present invention is to provide an apparatus for detecting movement of an object in a secured area which is automatically operable with any one of a family of Gunn oscillators, each having a quiescent bias current that can differ due to variations in its manufacturing process, and that can vary due to temperature changes and due to changes in its characteristics over its lifetime.

Still another object of the present invention is to provide an apparatus which is capable of detecting minor movement in a secured area and which is reliable and relatively inexpensive to manufacture.

Briefly, the present invention includes a Gunn oscillator device having input terminals that are capable of receiving a potential difference which is subject to variations and which serves to produce a bias current in the device, the device being responsive to a constant potential difference and operative to radiate microwave energy at a first frequency, and further responding to Doppler-shifted energy reflected from a moving object and producing a corresponding variation in the bias current, an operational amplifier responsive to the potential difference and a reference signal for developing a first signal when the potential difference exceeds the reference signal and a second signal when it is less, a series-pass transistor connected to a source of DC potential and the operational amplifier and being switchable between a conducting and a nonconducting state in response to the first and second signals and serving to maintain the potential difference at a constant value, and a resistive element connected between an output of the transistor and the Gunn oscillator for sensing the variation in the bias current and for developing an output signal representative of the movement of the moving object.

An advantage of the present invention is that it is able to inexpensively and reliably detect the movement of a moving person or object within an area under observation.

Another advantage of the present invention is that it is operable with any one of a family of Gunn oscillators and includes a circuit that provides a constant potential difference across the Gunn device while detecting minute variations in its bias current.

The foregoing and other objects and advantages of the invention will be apparent from the following detailed description of the preferred embodiment which makes reference to the single FIGURE of the drawing.

IN THE DRAWING

FIG. 1 is a schematic diagram illustrating an apparatus for detecting the movement of a moving object in accordance with the present invention.

DETAILED DESCRIPTION OF THE PREFERRED EMBODIMENT

Referring now to FIG. 1, an apparatus, generally designated by the numeral 10, for detecting the movement of a moving object is illustrated in a schematic diagram in accordance with the present invention. The apparatus 10 includes a Gunn oscillator 12, an antenna 14, a filter circuit 16, series voltage regulator circuits 18 and 20, a voltage sensing circuit 22 and a detector circuit 24 for developing an output signal corresponding to the movement of the moving object.

In the description that follows, with respect to components of the circuits 16–24, a transistor is denoted by the letter Q followed by a number, a resistor by the letter R followed by a number, and other types of components by an identifying letter, such as C for a capacitor and D for a diode. Nodal points within the network are designated solely by a number.

Although the various elements are shown in the form of discrete classical electrical components, it will be appreciated that these elements are only representative of the electrical characteristics exhibited by various components and that the apparatus may be fabricated as an integrated circuit.

The Gunn oscillator 12 is of the conventional type and includes a Gunn element disposed in a cavity which is resonant at a predetermined frequency in the X-band region of the electromagnetic spectrum. In the security industry, such frequency is in the range between 10.500 and 10.550GHz. The Gunn oscillator has a non-linear resistive impedance characteristic and produces microwave energy at the X-band frequency in response to a constant DC potential difference across its input terminals 26 and 28. The magnitude of the potential difference is preferably the optimum value specified by the manufacturer of the Gunn device and should not exceed a rated maximum value. Upon the application of the potential difference direct current bias current flows through the terminals 26 and 28. It should be recognized that in view of manufacturing tolerances, the bias current flowing through any one of a family of Gunn oscillators is different.

The antenna 14 is of the horn-type and is driven by the Gunn oscillator 12 to radiate electromagnetic waves of sinusoidal waveform such that they saturate an area (not shown) which is to be secured by the apparatus.

The electromagnetic waves radiating from the antenna 14 strike objects or targets within the radiation pattern of the antenna and are reflected back and received at the antenna 14. The reflected waves cause the bias current flowing through the Gunn oscillator to vary in a pattern representative of an alternating Doppler signal. This corresponds to the movement of the object within the antenna pattern. The Doppler signals normally have a frequency in the range between 5 and 100 Hertz which corresponds to a person walking.

The filter circuit 16 includes a diode D which is serially connected to an alternating current voltage source or the like 30 and which serves to rectify the alternating current voltage into a unidirectional DC signal. A shunt capacitor C1 is connected to the output of the diode D and serves to maintain the voltage across its terminals constant. This smooths the rectified signal so as to reduce its ripple. In the preferred embodiment, the source 30 produces an AC voltage of 12 volts and a DC voltage of approximately 16 volts appears across the capacitor C1.

The series voltage regulator circuit 18 includes an operational amplifier 32, a voltage divider 34 and a transistor Q1. The operational amplifier 32 includes an inverting input 36, a non-inverting input 38 and an output 40. A positive source of potential is applied at 42 and a negative source of potential is applied at 44. The output 40 is coupled to the base of transistor Q1 and the inverting input 36 is connected to a node 46 between serially connected resistors R1 and R2 of the voltage divider 34, the other terminal of the resistor R2 being connected to a conductor 45. The non-inverting input 38 is coupled to the cathode of a zener diode, which has its anode connected to the conductor 45. A bias resistor R3 is connected between the cathode and a terminal 60. This permits the diode to conduct when the voltage appearing at its cathode exceeds a predetermined reference voltage and enables the zener diode Z to supply a reference voltage to the input 38. The operational amplifier 32 serves to develop a highly amplified and inverted signal on its output 40 in response to any difference in magnitude between the signals applied to its inverting and non-inverting terminals. In the preferred embodiment, the zener diode Z provides a 6.2 volt reference signal, and the operational amplifier 32 has the gain between 100,000 and 200,000 and is of the conventional dual 741 type, such as one manufactured by the National Semiconductor Company.

The transistor Q1 is of the NPN type and has its collector connected to the output of the filter circuit 16, its emitter connected to a terminal 48 of the resistor R1, and its base connected to the output 40. The transistor Q1 is preferably one designated as the 2N6290 and serves to conduct when its base-to-emitter junction is forward biased and to be non-conducting when the junction is reverse biased. Any variation in the voltage at the emitter and by voltage divider action at the node 46 causes an inverted amplified signal to be developed at the output 40 which will tend to either forward bias or reverse bias the transistor Q1 depending upon whether the corresponding voltage at the node 46 exceeds or is less than the reference voltage applied to the input 38. When the voltage developed at input 36 is less than that at input 38, the base-to-emitter junction of the transistor Q1 is forward biased causing Q1 to conduct. Similarly, when the voltage at input 36 exceeds that at input 38, transistor Q1 is reverse biased causing Q1 to turn off. Accordingly, the voltage at the junction 48 is maintained generally constant and contains only a small ripple.

It has been found that the series voltage regulator circuit 18 serves to reduce the ripple of the filtered DC voltage by a factor corresponding to the gain of the operational amplifier 32. Thus, with a gain of about 100 thousand only a ten microvolt ripple appears on the direct current voltage at the terminal 48.

The series voltage regulator 20 includes an operational amplifier 50, the voltage divider sensing circuit 22 and a transistor Q2. The operational amplifier 50 includes an inverting input 52, a non-inverting input 54 connected to the junction between the cathode of the zener diode Z and the bias resistor R3, and an output 56 connected to the base of the transistor Q2. The operational amplifier 50 is similar to the amplifier 32 previously described and serves to develop a highly amplified inverted signal in response to any difference in magnitude between signals applied to its terminals 52 and 54.

Transistor Q2 is of NPN type with its collector connected to the terminal 48 and its emitter connected to the terminal 60. The transistor Q2 is preferably identical to the transistor Q1 and serves to conduct when its base-to-emitter junction is forward biased and to be non-conducting when such junction is reverse biased. This permits it to conduct a constant potential without any appreciable ripple to the terminal 26 in a manner as will be subsequently described in detail.

The voltage divider 22 comprises serially connected resistors R4 and R5, respectively connected between the input terminals 26 and 28 of the Gunn oscillator 12. Node 62, the junction between resistors R4 and R5, is connected by a conductor to the inverting input 52 of the operational amplifier 50 so as to supply a voltage indicative of the potential difference across the terminals to the amplifier. In the preferred embodiment, the resistor R4 has a resistance of about 330 ohms and the resistor R5 has a resistance of about 1.8Kohms. This resistance ratio provides substantially the entire potential difference developed across the terminals 26 and 28 to be applied to the input 52.

The detector circuit 24 includes a resistor R6 connected between the terminals 60 and 26, a capacitor C2 and an amplifier 66. The resistor R6 has a resistance that is much lower than the series resistance through the resistors R4 and R5 and serves to provide a current path for the bias current flowing through the Gunn ocscillator 12. Accordingly, any variation in bias current flowing through the terminals 26 and 28 produces a corresponding change in the output voltage developed across the resistor R6. The capacitor C2 serves to remove the ready state component of the voltage developed across the resistor R6 and the amplifier 66 serves to amplify the corresponding variations in output voltage and to apply the amplified signal to the appropriate signal processing electronics 68 which may include for example, a warning light, a buzzer, etc.

In operation, with any one of a family of Gunn oscillators 12 connected to the terminals 26 and 28 and the source 30 energized, the constant potential difference is provided across the terminals 26 and 28 independent of the bias current flowing through the oscillator. The filter circuit 16 rectifies and smooths the alternating current voltage supplied by the source 30 into a DC voltage having a magnitude of about 16 volts. In a manner as previously described, when the voltage appearing at the terminal 48 exceeds 12 volts the divided voltage appearing at node 46 will correspondingly exceed the 6.2 reference voltage developed by the zener diode Z and applied at the reference non-inverting input 38. This causes the base-to-emitter junction of transistor Q1 to be reversed biased, which in turn causes it to turn off.

When the voltage at the terminal 48 drops below 1 volts, such change is amplified in a similar manner by the operational amplifier 32 and applied as a positive potential to the base of the transistor Q1, thus, forward biasing Q1 and causing it to conduct. As a result, a generally constant DC potential is maintained at the terminal 48.

The series voltage regulator circuit 20 functions in a manner similar to that of the regulator circuit 18. When the voltage at the input terminal 26 of the Gunn oscillator 12 exceeds the optimum bias potential of 7.5 volts the potential developed across the resistor R5 of the voltage divider 22 is greater than 6.2 volts. Hence, the voltage applied to the inverting input terminal 52 is greater than the level of the reference signal applied at the non-inverting terminal 54. This causes the operational amplifier 50 to develop a highly negative potential at its output 56. This forces transistor Q2 to immediately turn off, causing the potential at input terminal 26 to drop. Similarly, when the potential at the terminal 26 falls below 7.5 volts, the potential appearing at the input 52 is less than that developed at the non-inverting reference terminal 54. This produces a positive potential at the output 56 which causes transistor Q2 to turn on, and the potential at terminal 26 to increase. The transistor Q2 remains on until the potential difference between the terminals 26 and 28 equals 7.5 volts.

With a constant potential difference applied across the terminals 26 and 28 a direct current bias current flows through the Gunn oscillator 12. Under the described bias condition the oscillator 12 develops microwave energy at a predetermined frequency in the X band region of the electromagnetic spectrum. This energy is radiated through the antenna 14 to the secured area under observation. When an object moves through the area it scatters the incident microwave energy. A portion of the scattered energy is reflected back to the antenna 14 and serves to modulate the bias current flowing through the Gunn oscillator 12. This reflected energy has a frequency that is Doppler shifted relative to the radiated frequency by an amount corresponding to the movement of the moving object and produces a corresponding variation in the magnitude of the bias current.

Since the resistance of the voltage divider circuit 22 is much greater than that of the resistor R6, the modulated bias current flows through the resistor R6. As a result the variation in bias current is transformed into a time varying output signal across the resistor R6. The capacitor C2 removes the direct current component of the output signal. The amplifier 66 serves to amplify the remaining time varying component of the output signal to a preselected level. This modulated or time varying output signal corresponds to the movement of the moving object in the area under observation and is applied to the appropriate signal processing electronics 68.

As can be seen from the foregoing, the Gunn oscillator in accordance with the present invention serves as both the transmitting and the receiving element.

While the invention has been particularly shown and described with reference to a preferred embodiment, it will be understood by those skilled in the art that various alterations and modifications in form and detail may be made therein. Accordingly, it is intended that the following claims cover all such alterations and modifications as fall within the true spirit and scope of the invention.

What is claimed is:

1. A microwave motion detecting apparatus for detecting relative motion of an object comprising:
   a first terminal;
   a second terminal;
   a third terminal;
   resistance means connected between said first and second terminals;
   a Gunn oscillator connected between said second and third terminals for receiving a predetermined operating potential from which it draws an operating current, said oscillator being operative to generate microwave radiation and when said radiation is reflected by a moving object so as to cause Doppler shifted radiation to be received by said oscillator, develops variations in said operating current;
   power supply means having a power output connected between said first and third terminals and a sensing input connected between said second and third terminals, said power supply means being operative to develop said predetermined operating potential between said second and third terminals by developing an output potential between said first and third terminals which exceeds said predetermined operating potential by the voltage drop across said resistance means as determined by said operating current; and
   detector means responsive to variations in the potential at said first terminal caused by the voltage drop across said resistance means due to said variations in said operating current, and operative to develop a detected signal indicative of the motion of said object.

2. A microwave motion detecting apparatus as recited in claim 1 wherein said detector means includes:
   a capacitor; and
   amplifier means connected by said capacitor to said first terminal, said amplifier means being responsive to said variations in the potential at said first terminal and operative to develop said detected signal.

3. A microwave motion detecting apparatus as recited in claim 1 wherein said power supply means includes:
   a source of DC potential;
   a first voltage regulator for receiving said DC potential and for developing a regulated potential; and
   a second voltage regulator for receiving said regulated potential and said predetermined operating potential and for developing said output potential.

4. A microwave motion detecting apparatus as recited in claim 3 wherein said DC potential source includes:
   a source of AC potential;
   a diode; and
   a capacitor connected by said diode across said AC potential source,
   whereby said AC potential is rectified by said diode and filtered by said capacitor to develop said DC potential.

5. A microwave motion detecting apparatus as recited in claim 3 wherein said first voltage regulator includes:
   an operational amplifier for comparing said regulated potential with a predetermined reference potential and for generating a control signal; and
   a transistor having a first electrode for receiving said DC potential, a second electrode for receiving said control signal and a third electrode for developing said regulated potential.

6. A microwave motion detector apparatus as recited in claim 3 wherein said second voltage regulator includes:
   means for developing a predetermined reference potential;
   voltage divider means for developing a reduced potential from said predetermined operating potential;
   operational amplifier means for comparing said reduced potential and said reference potential and for developing a control signal; and
   transistor means responsive to said control signal and operative to develop said output potential from said regulated potential.

* * * * *